April 17, 1951 W. R. FOX 2,549,075
TIRE VALVE
Filed April 3, 1947

Inventor
Wilfred R. Fox
By Thos. H. Johnston
Attorney

Patented Apr. 17, 1951

2,549,075

UNITED STATES PATENT OFFICE 2,549,075

TIRE VALVE

Wilfred R. Fox, Flint, Mich.

Application April 3, 1947, Serial No. 739,051

5 Claims. (Cl. 277—8)

This invention relates to an improved tire valve.

The valve is particularly intended for use in conjunction with a double-chambered inner tube having an outer annular chamber next the crown of the tube, separated by a suitable dividing wall from an inner annular chamber next the inner periphery of the tube.

The objects of the invention are to provide a valve wherein both the inner and outer chambers of the inner tube may be inflated simultaneously to the same pressure, wherein, after both chambers have been inflated to a given pressure, the outer chamber may, if so desired, be further inflated individually to a pressure greater than that of the inner chamber, wherein, after both chambers have been inflated to a desired pressure, air may be permitted to escape from the outer chamber individually, wherein, upon puncture of the wall of the outer chamber, air cannot leak from the inner chamber through the valve to the outer chamber to cause a complete flattening of a tire embodying the tube, wherein a tubular compound valve plug will be provided to seal the inner chamber as well as seal the valve stem against the escape of air from the outer chamber around the plug when the plug is closed, wherein the plug may be manually adjusted to unseal the inner chamber so that the inner chamber may be inflated, wherein the plug will be equipped with an annular channel-shaped back pressure valve adapted to be expanded by air pressure against the plug and stem for sealing the stem against the escape of air around the plug when the plug is open, and wherein the stem will be formed with a conical neck adapted to guide the back pressure valve into the stem as the plug is inserted therein, so that the plug may be installed or removed with equal facility.

Other and incidental objects of the invention will appear during the course of the following description, and in the drawings.

Figure 1:
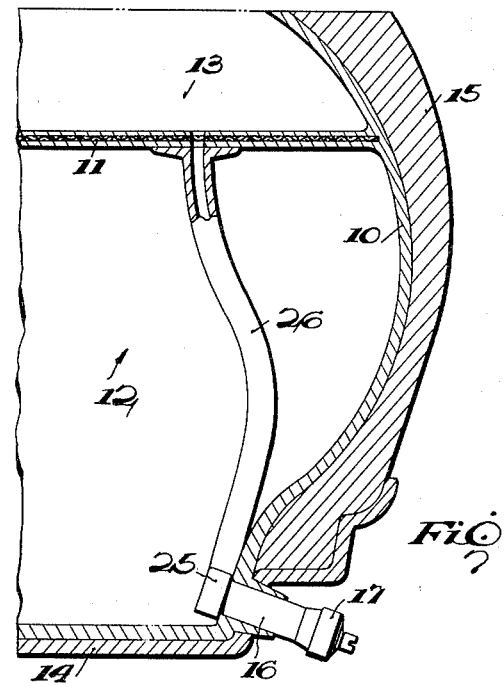
Figure 1 is a fragmentary vertical section showing my improved valve in conjunction with a conventional tire casing and wheel rim.

Referring now more particularly to the drawings, I have shown my improved valve in conjunction with an inner tube 10 having a partition wall 11 dividing the interior of the tube into an inner annular chamber 12 and an outer annular chamber 13. A conventional wheel rim is indicated at 14, and a conventional casing at 15, the latter coacting with the inner tube to provide a tire encircling the rim.

In carrying the invention into effect, I employ a tubular valve stem 16 over the outer end of which is normally screwed a removable closure cap 17, and seated within the cap is an annular gasket 18 coacting with the outer end edge of the stem to form a seal between the cap and stem. Adjacent its outer threaded portion, the stem is provided with a conical neck 19.

Near its inner end, the stem is offset to form an internal flat annular stop shoulder 20, while at its inner terminal said stem is provided with an end wall 21, and formed in said end wall is an axial port 22 communicating with the inner chamber 12 of the inner tube 10. Formed in the side wall of the stem near said end wall is a side port 23. The inner tube is vulcanized or otherwise appropriately secured to the stem, being preferably provided with a nipple 24 to receive the stem therethrough, and similarly secured to the inner end portion of the stem is a surrounding collar 25 from which leads a tube 26 connecting the port 23 with the outer chamber 13 of the inner tube, the collar and tube 26 being of rubber or other suitable material.

Manually adjustable within the stem 16 is a removable, tubular, compound valve plug 27 provided at its outer end portion with a collar 28 screwed into the outer end portion of the stem. At its outer end, the plug is formed with a preferably knurled head 29, while at its inner end portion the plug is offset to provide an internal flat annular stop shoulder 30 as well as an external flat annular stop shoulder 31 from which latter projects a tubular tip 32 of less diameter than the body of the plug. Formed within the plug near its outer end is a conical seat 33, and coacting with said seat as well as with the shoulder 30 is a conventional removable valve unit indicated as a whole at 34, said unit being usually known in the trade as valve insides. As will be appreciated, the unit 34 will normally prevent the egress of air through the plug but is operable, when the usual nozzle of a conventional air hose is applied to the head 29, to permit inflation of the inner tube 10.

Formed in the tip 32 of the plug 27 near the free end of said tip are ports 35, and more or less freely swiveled upon the free end of said tip is a pear-shaped valve 36 adapted to seal the port 22 of the stem 16 when the plug is adjusted to closed position. The valve may be of rubber or the like.

Freely surrounding the tip 32 of the plug 27 above the ports 35 in said tip is a flat annular valve 37, and abutting said valve at its lower side is a flexible channel-shaped annular valve 38. Both of these valves may be of rubber or the like. Overlying the valve 37 to coact with the stop shoulder 31 of the plug is a metal washer 39, while a like washer 40 is received within the channel of the valve 38, and struck from the tip 32 below the latter washer are spurs 41 limiting the valve assembly against displacement from said tip.

Figure 2:
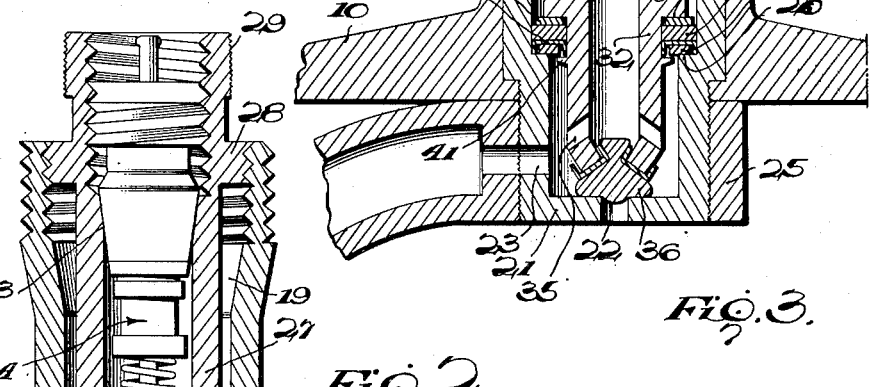
Figure 2 is a greatly enlarged detail section showing the compound valve plug in open position.
Figure 2:
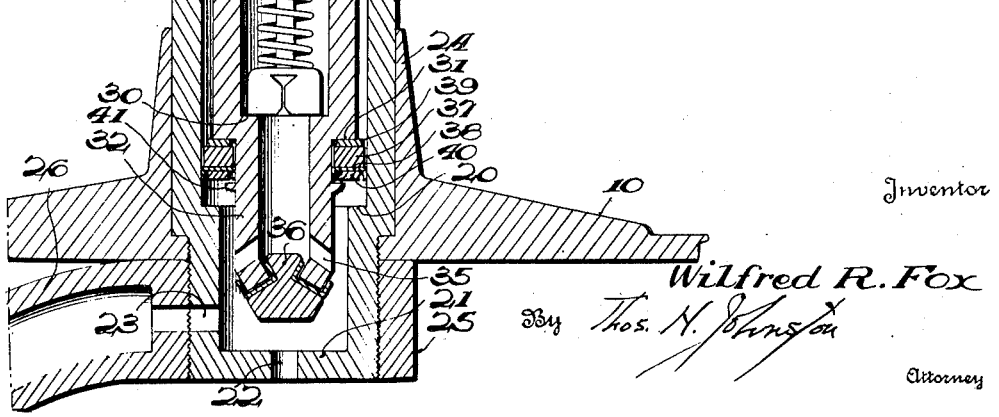

It is now to be observed that when the plug 27 is adjusted to open position, as seen in Figure 2 of the drawings, the nozzle of a conventional air hose may be applied to the head 29 of said plug for inflating the chambers 12 and 13 of the inner tube 10 simultaneously to the same pressure. Concurrently, air in the lower portion of the stem exerting a back pressure therein will enter the channel of the valve 38, with the result that the side portions of said valve will be expanded one against the inner wall of the stem and the other against the outer wall of the tip 32 to seal the stem between the stem and plug so that air may not escape around the plug. As will be perceived, the seal provided by the valve will be uniform throughout the circumference of the valve and will be intensified as the air pressure in the lower portion of the stem is caused to rise. In the open position of the plug, air may, by depressing the stem of the valve unit 34, as will be well understood, be released from both of the chambers 12 and 13 of the inner tube 10 simultaneously.

Figure 3:
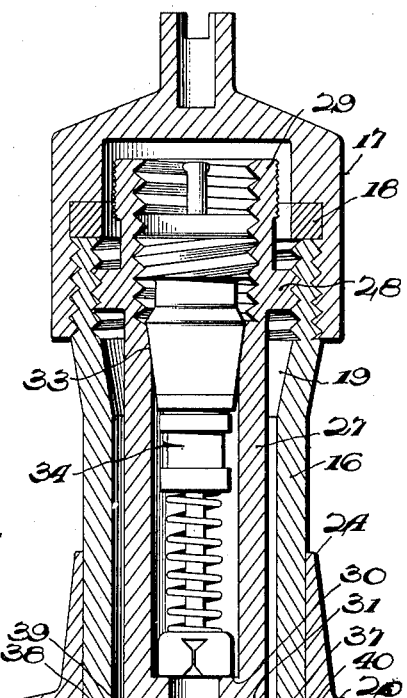
Figure 3 is a view similar to Figure 2 and showing the valve plug in closed position.

By screwing the plug 27 inwardly within the stem 16, the plug may be adjusted to closed position, as shown in Figure 3 of the drawings. In this position of the plug, the valve 36 will seal the port 22 of the stem so that communication between the chambers 12 and 13 of the inner tube 10 will be cut off. Thus, should the wall of the chamber 13 be punctured, air cannot leak from the chamber 12 through the device into the chamber 13 to cause a complete collapse of the tire.

As the plug 27 is tightened in closed position, the valve 37 will be compressed somewhat between the stop shoulder 20 of the stem 16 and the stop shoulder 31 of the plug, the washers 39 and 40 being provided to avoid wear on the valve. Accordingly, the valve will be expanded radially to engage at its inner periphery with the outer wall of the tip 32 and at its outer periphery with the inner wall of the stem. The valve will thus seal the stem between the plug and stem so that air may not escape from the chamber 13 of the inner tube around the plug. Furthermore, as will be noted, the valve 38 will concurrently function to provide a secondary seal below the valve 37 between the plug and stem and thus relieve and protect the primary seal formed by the latter valve.

As will now be perceived, air may, when the plug 27 is in closed position, be introduced into the chamber 13 of the inner tube 10 individually. Moreover, air may, by depressing the stem of the valve unit 34, be released from said chamber individually.

The plug 27 may, as will be apparent, be screwed out of the stem 16 and thus readily removed. To facilitate the installation of the plug, the conical neck 19 is provided in the stem. As the tip 32 of the plug is inserted into the stem and moved downwardly therein to install the plug, the sloping wall of the neck will gradually squeeze the outer side portion of the channel-shaped valve 38 radially inward and thus contract the valve circumferentially to easily ride into the lower straight portion of the stem, when, as the collar 28 reaches the mouth of the stem, the plug is rotated and thus engaged with the stem. Thus, since the mouth of the stem is of an enlarged diameter to permit the valve 38 to clear the internal threads of the stem, the plug may, as will be seen, be either installed or removed with equal facility.

Having thus described my invention, I claim:

1. A tire valve including a tubular stem provided with side and end ports at one end thereof, a tubular valve plug axially adjustable within the stem to open and closed positions in the stem and provided with a port communicating with both of said side and end ports in the open position of the plug and with only said side port in the closed position of the plug, a valve carried by the plug for sealing said end port in the closed position of the plug while maintaining communication between the port of the plug and said side port of the stem, a flat resilient valve carried by the plug at one side of its port and adapted to be compressed between said plug and stem and thus expanded radially to form a primary seal between the plug and stem in the closed position of the plug, and a flexible channel-shaped back pressure valve carried by the plug at said one side of its port and expansible by back pressure of air in the stem to provide a secondary seal between the plug and stem in the closed position of the plug.

2. A tire valve including a tubular stem offset to form an internal stop shoulder and provided with side and end ports at one side of said shoulder, a tubular valve plug screwed axially into the stem and offset to provide a reduced tip having a surrounding stop shoulder externally of the plug and in substantially axial alignment with said internal shoulder, the plug being adjustable to open and closed positions in the stem and said tip being formed with a port communicating with both of said side and end ports in the open position of the plug and with only said side port in the closed position of the plug, a valve carried by said tip for sealing said end port in the closed position of the plug, a flat resilient valve surrounding said tip and adapted to be compressed between said stop shoulders and thus expanded radially to form a seal between the stem and plug in the closed position of the plug, and a flexible annular channel-shaped valve surrounding said tip beneath said flat valve and expansible by pressure of air in the stem to provide a seal between the plug and stem in the open position of the plug as well as a seal between the plug and stem in the closed position of the plug.

3. A tire valve including a tubular stem provided at its lower end portion with a chamber having an end port at the lower end thereof as well as a side port located above said end port, a tubular valve plug axially adjustable within the stem outwardly to open position in said stem and inwardly to closed position in said stem and having means for sealing the end port of said chamber, said plug being provided at its lower end portion with a port opening into said chamber to communicate with both of said side and end ports of the chamber in the open position of the plug and with only said side port of the chamber in the closed position of the plug, and a yieldable valve carried by the plug above the port therein and movable by the plug, as it is adjusted inwardly, to be compressed between the plug and stem in the closed position of the plug and seal said chamber at its upper end as well as cut off escape of air from both of said side and end ports of the chamber outwardly through said chamber.

4. A tire valve including a tubular stem provided at its lower end portion with a chamber having an end port at the lower end thereof as well as a side port located above said end port, a tubular valve plug axially adjustable within the stem outwardly to open position in said stem and inwardly to closed position in said stem and having means for sealing the end port of said chamber, said plug being provided at its lower end portion with a port opening into said chamber to communicate with both of said side and end ports of the chamber in the open position of the plug and with only said side port of the chamber in the closed position of the plug, and a flexible valve fixed to the plug above the port therein and expansible by back pressure of air through said chamber to engage the wall of the stem and cut off the escape of air around the plug in the open position of said plug, said valve being movable by the plug, as it is adjusted inwardly, to overlie the upper end of said chamber in the closed position of the plug and seal said chamber at its upper end.

5. A tire valve including a tubular stem provided at its lower end portion with a chamber having an end port at its lower end as well as a side port located above said end port, a tubular valve plug axially adjustable within said stem outwardly to open position in said stem and inwardly to closed position in said stem, an individual valve secured to engage the wall of the stem and the lower end of the plug and movable thereby to seal the end port of said chamber in the closed position of the plug, the plug being provided at its lower end portion above said valve with a port opening into said chamber to communicate with both of said side and end ports of the chamber in the open position of the plug and with only said side port of the chamber in the closed position of the plug, and a flexible valve fixed to the plug above the port therein and expansible by back pressure of air through said chamber to engage the wall of the stem and cut off the escape of air around the plug in both the open and closed positions of said plug.

WILFRED R. FOX.

REFERENCES CITED

The following references are of record in the file of this patent:

UNITED STATES PATENTS

| Number | Name | Date |
|---|---|---|
| 1,478,584 | Schweinert | Dec. 25, 1923 |
| 1,510,205 | Beaty | Sept. 30, 1924 |
| 2,081,040 | King | May 18, 1937 |

FOREIGN PATENTS

| Number | Country | Date |
|---|---|---|
| 20,437 | France | of 1917 |
| 21,963 | Great Britain | Oct. 17, 1908 |